United States Patent
Hahn et al.

(10) Patent No.: US 6,673,731 B2
(45) Date of Patent: Jan. 6, 2004

(54) MGAL$_2$O$_4$-SYSTEM DIELECTRIC CERAMIC COMPOSITION AND METHOD FOR FABRICATING DIELECTRIC CERAMIC USING THE SAME

(75) Inventors: Jin Woo Hahn, Daejon (KR); Dong Young Kim, Daejon (KR); Sang Seok Lee, Daejon (KR); Tae Goo Choy, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 16 days.

(21) Appl. No.: 10/152,221

(22) Filed: May 20, 2002

(65) Prior Publication Data

US 2003/0119654 A1 Jun. 26, 2003

(30) Foreign Application Priority Data

Dec. 26, 2001 (KR) ........................................ 2001-85166

(51) Int. Cl.$^7$ ............................................ C04B 35/443
(52) U.S. Cl. ...................................... 501/120; 501/127
(58) Field of Search ................................ 501/120, 127

(56) References Cited

U.S. PATENT DOCUMENTS

| | | | |
|---|---|---|---|
| 3,950,504 A | 4/1976 | Belding et al. | ............. 423/600 |
| 4,273,587 A | 6/1981 | Oda et al. | .................. 106/73.4 |
| 4,348,485 A | 9/1982 | Oohasi et al. | ............. 501/115 |
| 4,954,463 A | 9/1990 | Knauss | ........................ 501/120 |
| 6,455,453 B1 * | 9/2002 | Chikagawa | ................. 501/120 |

OTHER PUBLICATIONS

Elsevier Science Ltd. and Techna 2001, "A new sintering aid for magnesium aluminate spinel", I. Ganesh, et al., 7 pages No month.

Elsevier Science Ltd. and Techna 1999, "Effect of attritor milling on the densification of magnesium aluminate spinel", R. Sarkar, et al., 5 pages No month.

Elsevier Science Ltd. 2001, Magnesium aluminate (MgAlcO4) spinel produced via self–heat–sustained (SHS) technique, L. Ping, et al., 14 pages No month.

* cited by examiner

Primary Examiner—Karl Group
(74) Attorney, Agent, or Firm—Blakely, Sokoloff, Taylor & Zafman

(57) ABSTRACT

The present invention relates to a ceramic dielectric material for communication components, which can be used in the microwave and millimeter wave frequency band. More particularly, the present invention relates to a dielectric ceramic composition for the microwave/millimeter wave frequency band having a very high quality factor and a low dielectric constant, and a method of manufacturing the dielectric ceramic using the same. The dielectric ceramic composition consists of spinel (MgAl$_2$O$_4$) as a major component and a small amount of lithium carbonate (Li$_2$CO$_3$) as a sub composition with a specific composition formula. The dielectric ceramic is manufactured from magnesia (MgO), alumina (Al$_2$O$_3$) and lithium carbonate (Li$_2$CO$_3$) as raw materials and through the ceramic processing of calcination, shaping and sintering. The obtained dielectric ceramic has the quality factor (Q×f) of 160,000 and the dielectric constant ($\epsilon_r$) of 8.5.

Composition formula:

$$MgAl_2O_4 + xLi_2CO_3 (mol\ \%)$$

where, $0 < x \leq 5$ (mol %).

4 Claims, 1 Drawing Sheet

MGAL$_2$O$_4$-SYSTEM DIELECTRIC CERAMIC COMPOSITION AND METHOD FOR FABRICATING DIELECTRIC CERAMIC USING THE SAME

BACKGROUND OF THE INVENTION

1. Field of the Invention

The invention relates generally to a dielectric ceramic material applicable to the fabrication of dielectric resonator components for microwave and millimeter wave frequency bands. More specifically, it relates to the spinel (MgAl$_2$O$_4$)-system dielectric ceramic composition having a high quality factor and a low dielectric constant, and a method of fabricating dielectric ceramics using the same.

2. Description of the Prior Art

As a demand on comprehensive information communication service including personal mobile communication service has been increased, the development of communication technology and system capable of rapidly transmitting a large quantity and a various kind of data are keenly required. In order to realize the high-speed wideband information communication service of the next-generation, it is necessary that the frequency resources of a millimeter wave capable of providing the wideband characteristic should be used. Therefore, there have been many actively running researches on communication systems and components that can be used at the millimeter wave frequency band.

It is required that the components for the millimeter wave frequency band should have extremely low loss characteristics, since the millimeter wave is attenuated severely when it propagates through the air and RF circuits. The components with low loss characteristics are possibly manufactured by using the low dielectric loss materials along with the optimization of the structure design. Generally, the dielectric materials for the communication components should have a large dielectric constant and also a low dielectric loss value for the purpose of miniaturizing the components' size and low insertion loss, respectively, although there are many cases that these two requirements conflict each other. Because the wavelength of the millimeter wave is very short, however, the demand for a large dielectric constant becomes less important, while the demand for extremely low dielectric loss becomes more important. Therefore, low dielectric loss materials should be used in manufacturing components that utilize the dielectric resonator characteristics such as filters or duplexers at the millimeter wave band. In addition it is also recommended that those materials have a very small (or approaching to 0) temperature coefficient of resonant frequency ($\tau_f$).

Dielectric ceramic compositions developed so far for the microwave applications have the dielectric constant exceeding approximately 20, and the value of the quality factor (Q×f) of them is below about 100,000, which is the barometer of the dielectric loss. However due to the large propagation loss of the millimeter wave the quality factor of the dielectric materials is required to be as large as over 100,000. And also, considering the short wavelength of the millimeter wave, it is required that those materials should have the dielectric constant below 10. Alumina (Al$_2$O$_3$) is a candidate material satisfying above conditions of the dielectric characteristics. This material, however, has usually been used only for a substrate material, and dielectric ceramic compositions with a low loss value in the microwave/millimeter wave band have rarely been developed so far.

SUMMARY OF THE INVENTION

The present invention is contrived to solve the above problems, and the object of the present invention is to provide a dielectric ceramic composition with a low dielectric loss value that can be used in the microwave/millimeter wave frequency band, and also the manufacturing method of the dielectric ceramics. The present invention employs spinel (MgAl$_2$O$_4$) as a basic composition, and a small amount of lithium carbonate (Li$_2$CO$_3$) as a sintering aid is added to MgAl$_2$O$_4$ in order to improve the sintering and consequently dielectric characteristics.

The spinel (MgAl$_2$O$_4$)-system dielectric ceramic composition of the present invention can be characterized in that the spinel (MgAl$_2$O$_4$) is used as a major component and lithium carbonate (Li$_2$CO$_3$) is used as a sub component, wherein the composition formula of them is as follows;

Composition formula:

MgAl$_2$O$_4$+xLi$_2$CO$_3$(mol %)

where, 0<x≦5 (mol %)

Also, a method of manufacturing the dielectric ceramic composition according to the present invention is characterized in that it comprises the step of mixing of magnesia (MgO) and alumina (Al$_2$O$_3$) as raw starting materials with the mole ratio of 1:1, the step of calcining the mixture, and the step of adding lithium carbonate (Li$_2$CO$_3$) of 0.1~5 mol % in excess to the calcined mixture, remixing, shaping and sintering sequentially;

Composition formula:

MgAl$_2$O$_4$+xLi$_2$CO$_3$(mol %)

where, 0<x≦5 (mol %)

Preferably, the calcination process is performed at the temperature of 1300~1350° C. for 4 hours and the sintering process is at 1600~1650° C. for 4 hours.

BRIEF DESCRIPTION OF THE DRAWINGS

The aforementioned aspects and the other features of the present invention will be explained in the following description, taken in conjunction with the accompanying drawings, wherein.

DETAILED DESCRIPTION OF PREFERRED EMBODIMENTS

Figure 1:
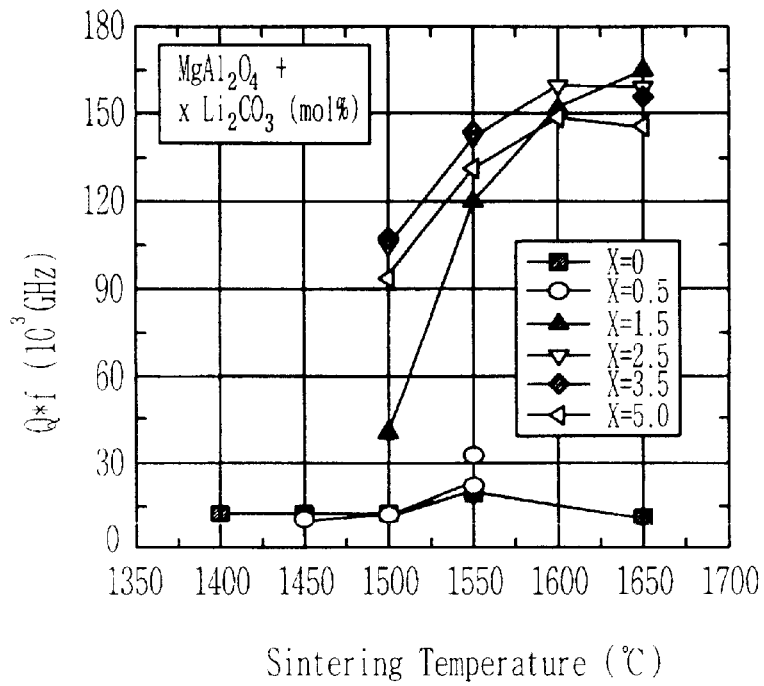
FIG. 1 shows a graph illustrating the variation of the quality factor (Q×f) of the spinel (MgAl$_2$O$_4$)-system dielectric ceramic as functions of the sintering temperature and the added amount of lithium carbonate (Li$_2$CO$_3$)

The present invention will be described in detail by way of a preferred embodiment with reference to the accompanying drawings.

Spinel (MgAl$_2$O$_4$) is a refractory material that is usually used as a structural ceramic material at high temperature due to its good mechanical strength at high temperature. It is generally known that the sintering temperature of pure spinel (MgAl$_2$O$_4$) material is very high, thus many researches to lower the sintering temperature have been made. Furthermore, it is known that a synthesis of pure spinel phase requires several times of calcining process at high temperature.

The present invention have contrived an calcining process by which the phase synthesis of spinel can be completed from raw materials and a sintering aid capable of lowering the sintering temperature. As a result, spinel ($MgAl_2O_4$)-system dielectric ceramic composition having a low dielectric loss value and a low dielectric constant at the microwave/millimeter wave frequency band has been developed.

The present invention provides a new dielectric ceramic composition in which spinel ($MgAl_2O_4$) is used as a major composition and lithium carbonate ($Li_2CO_3$) is added to the spinel ($MgAl_2O_4$) as a sub composition. It also provides the optimum processing parameters and the manufacturing method at each manufacturing steps in order to obtain the dielectric characteristic reproducibly.

Composition formula:

$MgAl_2O_4 + xLi_2CO_3$ (mol %)

where, $0 < x \leq 5$ (mol %)

In the present invention, in order to produce a dielectric ceramic material for the microwave/millimeter wave frequency band, spinel ($MgAl_2O_4$) phase was synthesized by mixing magnesia (MgO) and alumina ($Al_2O_3$) as raw materials and calcining the mixture. A small amount of lithium carbonate ($Li_2CO_3$) was added thereto as a sub composition.

In order to manufacture spinel ($MgAl_2O_4$) as a major composition, raw material powders of magnesia (MgO) and alumina ($Al_2O_3$) were mixed with the mole ratio of 1:1, and then the phase synthesis was carried out by a solid state reaction through the calcining process at the temperature of 1300~1350° C. for 4 hours. Next a small amount of lithium carbonate ($Li_2CO_3$) as a sub composition for facilitating the sintering was added to the powders of spinel ($MgAl_2O_4$) phase obtained by the above calcination process. Thereafter, they were mixed again, shaped and sintered at the temperature of 1400~1650° C. The above fabrication processes could produce the dielectric ceramic material for the microwave/millimeter wave application.

The present invention will be described below by reference to a preferred embodiment.

The composition formula used in the present invention is as follows:

Composition formula:

$MgAl_2O_4 + xLi_2CO_3$ (mol %)

where, $0 < x \leq 5$ (mol %)

Magnesia (MgO) and alumina ($Al_2O_3$) powders were selected as starting raw materials, and were wet-mixed with the mole ratio of 1:1 for about 20 hours. After drying step the mixed powders were calcined at 1300~1350° C. for 4 hours to produce a spinel ($MgAl_2O_4$) phase. From the result of XRD (X-Ray Diffractometry) analysis on the obtained powders, it could be confirmed that all the powders obtained through the calcination process had the spinel ($MgAl_2O_4$) phase. Thereafter, lithium carbonate ($Li_2CO_3$) of 0~5 mol % and a small amount of PVA (1 wt. %) as binder were added thereto. Then they were wet-milled again for 20 hours. The powders obtained through the drying process were passed through a sieve of number 100(aperture size is 150 μm) to prepare the formulated powder.

Thereafter, the formulated powders were poured into a cylindrical mold having the diameter of 20 mm and were molded with the pressure of about 1500 kg/cm². Then the green bodies were sintered at 1400~1650° C. for 4 hours to produce a dielectric ceramic samples. The dielectric characteristics and sintering density of the samples are shown in Table 1.

TABLE 1

| Composition | Sintering Temperature | Sintering Density (g/cm³) | Dielectric Constant ($\epsilon_r$) | Quality factor (Qxf, GHz) |
| --- | --- | --- | --- | --- |
| x = 0 | 1400° C. | 1.70 | 4.19 | 12,403 |
|  | 1450° C. | 1.74 |  | 12,764 |
|  | 1500° C. | 1.84 |  | 13,360 |
|  | 1550° C. | 2.05 | 5.02 | 19,603 |
|  | 1650° C. | 2.59 | 5.41 | 10,383 |
| x = 0.1 | 1450° C. | 1.89 |  | 7,789 |
|  | 1500° C. | 2.06 | 5.02 | 9,183 |
|  | 1550° C. | 2.37 | 5.87 | 7,507 |
| x = 0.25 | 1450° C. | 2.03 |  | 7,845 |
|  | 1500° C. | 2.29 | 5.75 | 9,916 |
|  | 1550° C. | 2.71 | 7.14 | 10,167 |
| x = 0.5 | 1450° C. | 2.33 | 6.31 | 10,547 |
|  | 1500° C. | 2.77 | 8.18 | 13,045 |
|  | 1550° C. | 3.19 | 9.61 | 22,246 |
| x = 0.8 | 1450° C. | 2.43 | 6.75 | 8,207 |
|  | 1500° C. | 2.90 | 8.65 | 15,497 |
|  | 1550° C. | 3.26 | 9.85 | 29,583 |
| x = 1.5 | 1500° C. | 3.25 | 8.08 | 40,243 |
|  | 1550° C. | 3.39 | 8.35 | 120,161 |
|  | 1600° C. | 3.44 | 8.41 | 152,669 |
|  | 1650° C. | 3.46 | 8.52 | 163,461 |
| x = 2.5 | 1500° C. | 3.39 | 8.33 | 107,124 |
|  | 1550° C. | 3.44 | 8.36 | 139,958 |
|  | 1600° C. | 3.46 | 8.45 | 160,541 |
|  | 1650° C. | 3.47 | 8.45 | 158,907 |
| x = 3.5 | 1500° C. | 3.45 | 8.83 | 109,414 |
|  | 1550° C. | 3.47 | 8.56 | 141,996 |
|  | 1600° C. | 3.46 | 8.88 | 151,583 |
|  | 1650° C. | 3.38 | 8.88 | 155,235 |
| x = 5.0 | 1500° C. | 3.39 | 8.40 | 93,371 |
|  | 1550° C. | 3.46 | 8.43 | 131,289 |
|  | 1600° C. | 3.45 | 8.34 | 148,794 |
|  | 1650° C. | 3.44 | 8.35 | 146,808 |

As can be seen from Table 1, when lithium carbonate ($Li_2CO_3$) was not added the sintering density, the dielectric constant and the quality factor had a relatively low value. But if an adequate amount of lithium carbonate ($Li_2CO_3$) was added, the dielectric ceramics of spinel ($MgAl_2O_4$) system having the quality factor over 160,000 and the dielectric constant of about 8.5 could be obtained at the sintering temperature of 1600~1650° C. They can be used in microwave/millimeter wave frequency band.

Figure 2:
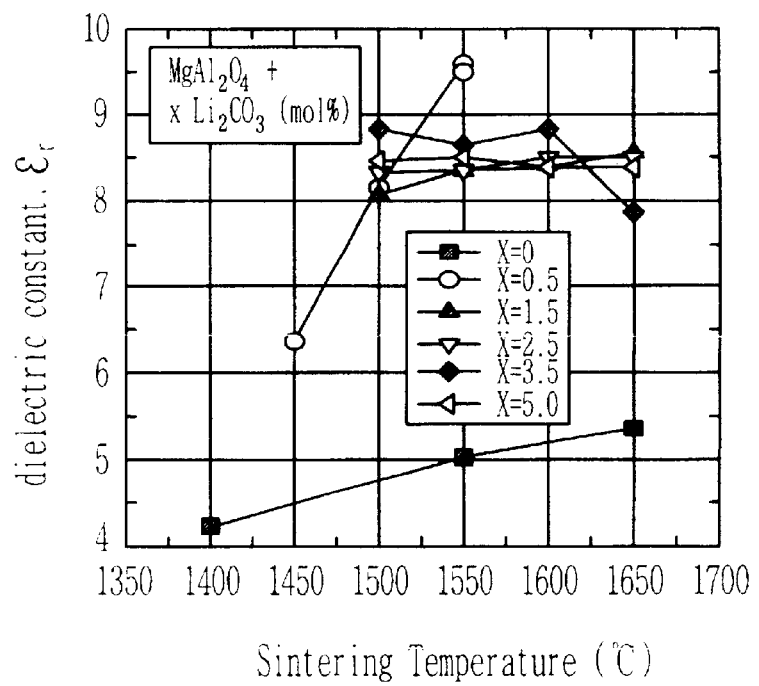
FIG. 2 shows a graph illustrating the variation of the dielectric constant ($\epsilon_r$) of the spinel (MgAl$_2$O$_4$)-system dielectric ceramic as functions of the sintering temperature and the added amount of lithium carbonate (Li$_2$CO$_3$).

FIG. 1 illustrates the variation of quality factor (Qxf) of a spinel ($MgAl_2O_4$)-system dielectric ceramic as functions of the sintering temperature and the amount of lithium carbonate ($Li_2CO_3$). FIG. 2 illustrates the variation of dielectric constant ($\epsilon_r$) of a spinel ($MgAl_2O_4$)-system dielectric ceramic as functions of the sintering temperature and the amount of lithium carbonate ($Li_2CO_3$).

As can be seen from FIGS. 1 and 2, the adequate amount of lithium carbonate ($Li_2CO_3$) and adequate sintering temperature are deemed to be 1.5~3.5 mol % and 1600~1650° C., respectively.

As mentioned above, the present invention provides a dielectric ceramic composition in which lithium carbonate ($Li_2CO_3$) of 1.5~3.5 mol % is added in excess to the spinel ($MgAl_2O_4$)-system material that was manufactured from the raw materials of magnesia (MgO) and alumina ($Al_2O_3$). According to the present invention, a dielectric ceramic material of spinel ($MgAl_2O_4$) system having the dielectric constant ($\epsilon_r$) of 8.3~8.8 and the quality factor (Qxf) of 150,000~160,000 can be obtained at the sintering temperature of 1600~1650° C.

Furthermore, this material can be possibly applied to the fabrication of some passive components that utilize the dielectric resonator characteristics such as bandpass filter, duplexer, oscillator, and the like in the microwave/millimeter wave frequency band.

The present invention has been described with reference to a particular embodiment in connection with a particular application. Those having ordinary skill in the art and access to the teachings of the present invention will recognize additional modifications and applications within the scope thereof.

It is therefore intended by the appended claims to cover any and all such applications, modifications, and embodiments within the scope of the present invention.

What is claimed is:

1. A spinel ($MgAl_2O_4$) system dielectric ceramic composition comprising spinel ($MgAl_2O_4$) as a major component and lithium carbonate ($Li_2CO_3$) as a sub component, wherein the composition formula of the spinel and the lithium carbonate is represented as the following equation;

Composition formula:

$$MgAl_2O_4 + xLi_2CO_3 (mol\ \%)$$

where, $0 < x \leq 5$ (mol %).

2. A manufacturing method for the dielectric ceramic composition comprising spinet ($MgAl_2O_4$) as a major component and lithium carbonate ($Li_2CO_3$) as a sub component according to the composition formula written below, the method comprising:

mixing magnesia (MgO) and alumina ($Al_2O_3$) as raw materials with the mole ratio of 1:1;

calcining the mixture;

adding lithium carbonate of 0.1~5 mol % in excess to the calcined mixture; and re-mixing, shaping and sintering sequentially;

Composition formula:

$$MgAl_2O_4 + xLi_2CO_3 (mol\ \%)$$

where, $0 < x \leq 5$ (mol %).

3. The method as claimed in claim 2, wherein said step of calcination is performed at the temperature of 1300~1350° C. for 4 hours.

4. The method as claimed in claim 2, wherein said step of sintering is performed at the temperature of 1600~1650° C. for 4 hours.

* * * * *